US006533233B2

United States Patent
Thomas

(10) Patent No.: US 6,533,233 B2
(45) Date of Patent: Mar. 18, 2003

(54) CUP HOLDER INSERT WITH SNACK OR COMBO CARRIER

(75) Inventor: Michael G. Thomas, Toronto (CA)

(73) Assignee: Georgia-Pacific Corporation, Atlanta, GA (US)

( * ) Notice: Subject to any disclaimer, the term of this patent is extended or adjusted under 35 U.S.C. 154(b) by 0 days.

(21) Appl. No.: 09/870,975

(22) Filed: May 31, 2001

(65) Prior Publication Data

US 2002/0043603 A1 Apr. 18, 2002

Related U.S. Application Data

(60) Provisional application No. 60/239,308, filed on Oct. 10, 2000.

(51) Int. Cl.[7] ................................................. A47K 1/08
(52) U.S. Cl. ..................... 248/311.2; 206/217; 206/549
(58) Field of Search ....................... 248/311.2; 220/23.4, 220/26.86, 23.83, 574, 574.1, 549; 206/217, 549

(56) References Cited

U.S. PATENT DOCUMENTS

| 5,072,909 A | | 12/1991 | Huang ..................... 248/311.2 |
| 5,421,459 A | * | 6/1995 | Mazzotti .................... 206/549 |
| 5,624,052 A | * | 4/1997 | Caldi .......................... 206/549 |
| 5,954,195 A | * | 9/1999 | Krueger et al. ............. 206/217 |
| 6,099,062 A | | 8/2000 | Siegel ..................... 296/37.12 |
| 6,109,580 A | * | 8/2000 | Stern et al. ............... 248/311.2 |
| 6,290,063 B1 | * | 9/2001 | Vogt et al. .................. 206/549 |

OTHER PUBLICATIONS

US 2001/0032791 A1, Hudson, Publication Date Oct. 25, 2001.*

* cited by examiner

Primary Examiner—Ramon O. Ramirez
(74) Attorney, Agent, or Firm—Michael W. Ferrell

(57) ABSTRACT

A cup-holder insert for accommodating a beverage and a snack or combo meal includes in a typical embodiment: a) central support member of generally circular cross-section configured to be disposed in a cup-holder and reside vertically in the cup-holder when placed therein and which defines a first cavity adapted to receive a cup; b) at least a first laterally projecting food receptacle portion which projects laterally from the support member when the insert is placed in the cup-holder, the first laterally projecting food receptacle portion defining a second cavity adapted to receive victuals; and c) at least a second laterally projecting food receptacle portion thereof which projects laterally from the support member when the insert is placed in the cup-holder, the second laterally projecting food receptacle portion defining a third cavity for receiving victuals. Preferably at least one of the cavities has an upwardly concave hemicylindrical shape so as to accommodate a round sandwich bun and the first and second laterally projecting food receptacle portions are opposed or angularly offset across the central first cavity.

36 Claims, 14 Drawing Sheets

CUP HOLDER INSERT WITH SNACK OR COMBO CARRIER

CLAIM FOR PRIORITY

This application is a non-provisional application based upon and incorporating material from U.S. Provisional Patent Application Ser. No. 60/239,308 of the same title filed Oct. 10, 2000, the priority of which is hereby claimed.

TECHNICAL FIELD

The present invention relates generally to inserts for cup-holders and particularly to an insert configured to provide a cup-holder with at least one additional receptacle for receiving food and the like.

BACKGROUND

Cup-holders are popularly employed in vehicles such as cars, boats, as well as attached to seats in stadiums, auditoriums and so forth. Such holders may be built-in or integral with a support structure or may be structured to hang on the window of a car, for example. See U.S. Pat. No. 5,072,909 to Huang, for instance.

Cup-holders are typically configured to receive a generally cylindrical or frustoconical cup or glass. There is shown in U.S. Pat. No. 6,099,062 to Siegal a cup-holder insert with a cylindrical bottom and a square top cavity. When inserted into a conventional cup-holder, the cup-holder then becomes suitable for supporting a square beverage carton. Oftentimes, consumables other than a beverage such as French fries, sandwiches and so forth are purchased and/or consumed contemporaneously with the beverage. The present invention transforms an ordinary cup-holder into a multi-cavity tray for conveniently receiving a cup and multiple food items.

SUMMARY OF INVENTION

The present invention provides a cup-holder insert which makes an ordinary automobile cup-holder, for example, suitable for holding a cup as well as a snack, such as french fries and in some embodiments a combo meal including a drink, french fries and a sandwich such as a hamburger. There is provided in accordance with the present invention a cup-holder insert including: a) a support member of generally circular cross-section configured to be disposed in a cup-holder and reside vertically in the cup-holder when placed therein and which defines a first cavity adapted to receive a cup; b) at least a first laterally projecting food receptacle food portion which projects laterally from said support member when the insert is placed in the cup-holder, the first laterally projecting food receptacle portion defining a second cavity adapted to receive victuals.

In a preferred embodiment, the cup-holder insert includes a second laterally projecting food receptacle portion defining a third cavity for receiving victuals; as would be used, for example, to accommodate a combo meal including a drink, french fries and a sandwich on a bun. The cup-holder insert of the present invention is typically integrally formed of a plastic material by way of deep-draw thermoforming, for example. Other modes of making the inventive cup-holder may be employed; for example, injection molding, injection blow-molding and the like. A particularly preferred plastic material is high impact polystyrene; however, other plastics, such as polycarbonates, polyesters, polyethylenes, polypropylenes, and the like could be employed if so desired.

The cup-holder insert of the present invention generally has a wall caliper from about 10 to about 100 mils (thousandths of an inch). Up to about 50 mils may be typical as is from about 10 to about 30 mils in wall thickness. A thinner or thicker wall may be used or, for example, additional strength may be provided by utilizing a ribbed construction.

In a typical embodiment a laterally projecting food receptacle portion has a generally rectangular cross section with four opposing sidewalls segments with a length of from about 3 to about 4.5 inches and a width from about 1¾ to about 2¾ inches. A length of about 3½ inches and a width of about 2¼ inches is typical. The bottom of the generally rectangular food receptacle portion is typically flat such that the receptacle is suitable to receive french fries in a box or a rectangular bag, for example. The generally rectangular food receptacle portion may have a pair of curved opposed sidewall segments about its length and most typically the opposing wall segments are upwardly and outwardly inclined with respect to the flat bottom as shown in the drawings appended hereto.

The cup-holder insert according to the present invention may have a laterally projecting food receptacle portion which defines an upwardly concave substantially hemicylindrical cavity with an arcuate bottom which would be suitable to accommodate a sandwich on a round sandwich bun, for example, a hamburger or other sandwich on a round roll. The hemicylindrical cavity typically has a width of from about 1 to about 4 inches, most preferably with a width of from about 1.5 inches to about 3 inches. In some embodiments the cylindrical axis of the hemicylindrical cavity is substantially coextensive with a line bisecting the mouth of the first (cup receiving) cavity. The arcuate bottom of the hemicylindrical cavity has a radius of curvature generally of from about 1¾ inches to about 2¾ inches. A radius of curvature of about 2¼ inches is typical for the arcuate bottom.

The cup receiving cavity may be truncated, that is, have an open bottom so that it will rest stably on a surface such as a flat surface, if and when the cup-holder insert is used independently of a cup-holder.

In a typical embodiment the top of the food receptacle cavity is substantially coplanar with the top of the cavity adapted to receive the drinking cup. In cases where three or more cavities are provided, it is particularly preferred to have the tops of all three cavities substantially coplanar with each other, typically at an elevation above the cup-holder in which the insert is placed.

A particularly preferred embodiment includes: a) a support member configured to be disposed in a cup-holder having a first segmented frustoconical sidewall including a lower frustoconical section, a transitional frustoconical section and an upper frustoconical section, wherein the upper frusto-conical section projects upwardly with respect to the cup-holder when placed therein, the first sidewall defining a first cavity adapted to receive a beverage cup. The insert further includes at least a first laterally projecting food receptacle portion which projects laterally from the upper frustoconical section typically at an elevation above the cup-holder when the insert is placed therein, the first laterally projecting food receptacle portion having a second sidewall defining a second cavity adapted to receive victuals.

Most preferably, the inventive cup-holder insert will rest in a cup-holder such that the transitional frustoconical section is seated therein. In some embodiments it may be preferred to have the bottom portions of the food receptacles to extend below the transitional frustoconical section in order to promote stability, particularly wherein the inventive insert is used without a cup-holder on a flat surface, for instance. As noted, in such cases an open bottom on the central cylindrical cavity is sometimes preferred.

In one embodiment there is provided a cup-holder insert including: a) a support member of generally circular cross-section configured to be disposed in a cup-holder and to reside vertically in the cup-holder as well as to define a first cavity adapted to receive a cup; b) at least a first laterally projecting food receptacle portion thereof which projects laterally from the support member, the first laterally projecting food receptacle portion defining a second cavity adapted to receive victuals; and c) at least a second laterally projecting food receptacle portion thereof which projects laterally from the support member, the second laterally projecting food receptacle portion defining a third cavity for receiving victuals and further wherein the second laterally projecting food receptacle portion is disposed opposite the first laterally projecting food receptacle portion. Most preferably, the first laterally projecting food receptacle portion has a generally rectangular cross-section with four opposing sidewall segments configured such that the minor axis of the second cavity is substantially coextensive with a line bisecting the mouth of the first cavity and has a length of from about 1¾ to about 2¾ inches the first cavity being provided with a substantially flat bottom as well as a major axis of from about 3 inches to 4.5 inches and wherein further the second laterally projecting food receptacle portion defines an upwardly concave substantially hemicylindrical cavity provided with an arcuate bottom. It should be appreciated from the Figures that a line bisecting the mouth of the central (cup-receiving) cavity of the insert may also be described as a line perpendicular to the cylindrical axis of the central cavity.

In still yet another embodiment, there is provided a cup-holder insert with a support member of generally circular cross section configured to be disposed in a cup-holder and reside vertically in the cup-holder when placed therein and which defines a first cavity adapted to receive a cup; at least a first laterally projecting food receptacle portion which projects laterally from the support member when the insert is placed in the cup holder, the first laterally projecting food receptacle portion defining a second cavity adapted to receive victuals; and at least a second laterally projecting food receptacle portion thereof which projects laterally from the support member when the insert is placed in said cup-holder, the second laterally projecting food receptacle portion defining a third cavity for receiving victuals, wherein the third cavity is angularly offset with respect to said second cavity at an angle of from about 60 degrees to about 140 degrees. Typically, the cup-holder insert here again has a first laterally projecting food receptacle portion provided with a generally rectangular cross-section with four opposing sidewall segments configured such that the minor axis of said second cavity is substantially coextensive with a line bisecting the mouth of said first cavity and has a length of form about 1¾ inches to about 3 inches, the first cavity being provided with a substantially flat bottom, as well as a major axis of from about 3 inches to about 4.5 inches; and the second laterally projecting food receptacle portion defines an upwardly concave substantially hemicylindrical cavity provided with an arcuate bottom.

In some embodiments, the third cavity is angularly offset with respect to said second cavity at an angle of from about 60 degrees to about 100 degrees, with from about 70 degrees to about 90 degrees being typical.

If so desired, there may be provided a third laterally projecting portion defining a fourth cavity disposed between the second and third cavities, in which cases the third cavity is angularly offset with respect to said second cavity at an angle of from about 100 degrees to about 140 degrees, with an angle of from about 110 degrees to about 130 degrees being typical. The fourth cavity is advantageously sized to receive a small cup which is used for ketchup or other sauces and thus has a depth of from about 0.5 to about 1 inch and may be generally cylindrical with a diameter from about 1.5 to about 2.5 inches.

The various features and advantages of the present invention will become better understood from the attached drawings and the following detailed description.

BRIEF DESCRIPTION OF DRAWINGS

The invention is described in detail below in connection with the various figures wherein like numbers designate like parts and in which:

FIG. 11 is a perspective view of still yet another embodiment of the present invention showing a cup-holder insert with first and second laterally projecting food receptacle portions which are angularly offset with another and wherein there is a third laterally projecting food receptacle portion there between;

In the various drawings appended hereto like parts in successive embodiments are numbered 100 numerals higher for purposes of convenience and comparison between the various embodiments described and illustrated hereinafter. Unless otherwise indicated such corresponding parts have generally the attributes described with respect to any one of such parts.

DETAILED DESCRIPTION

The present invention is described in detail below in connection with several embodiments for purposes of illustration only. Various modifications to particular embodiments within the spirit and scope of the present invention, which is defined in the appended claims, will be readily apparent to those of skill in the art.

Figure 1:
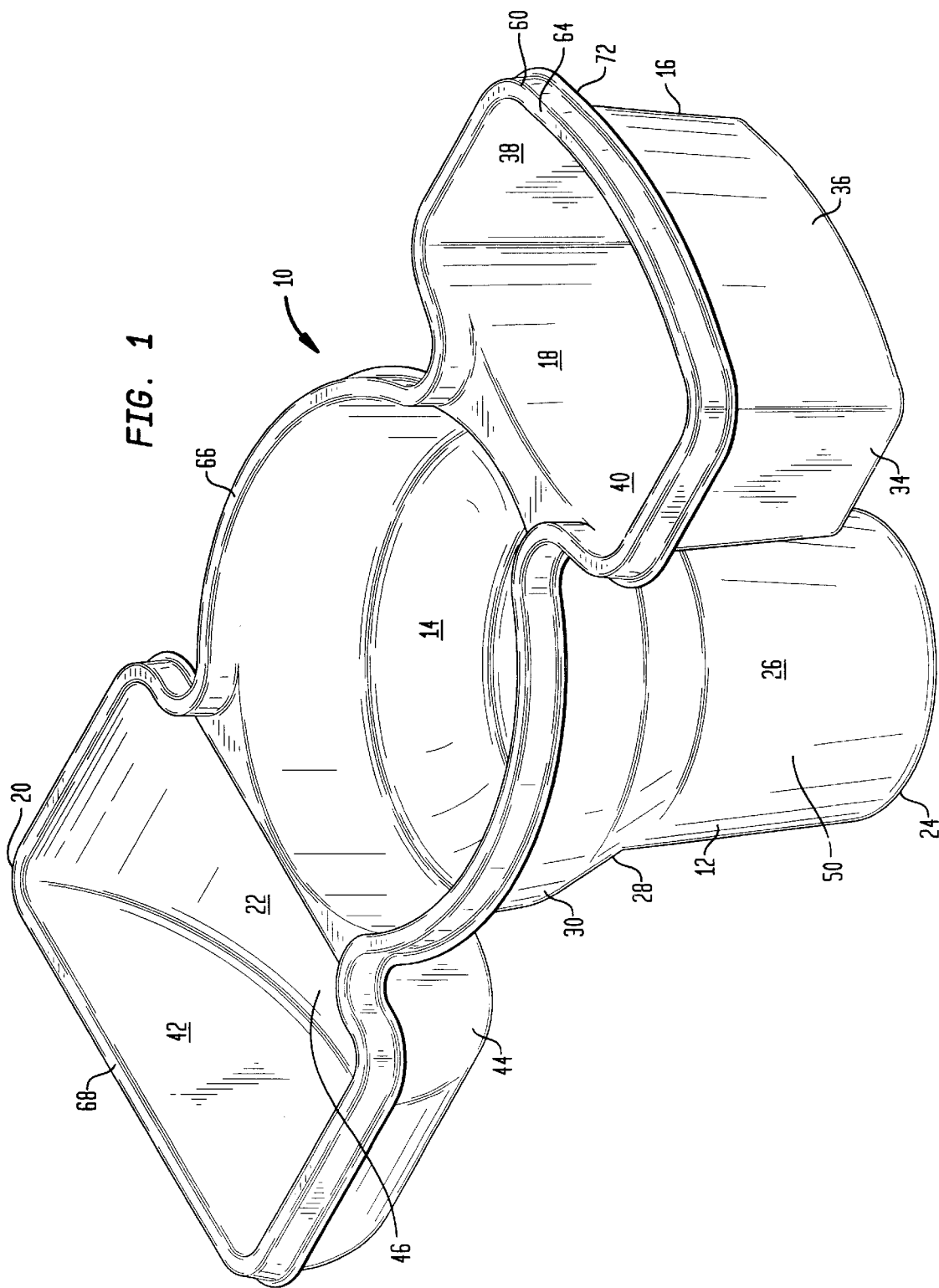
FIG. 1 is a perspective view of a first embodiment of the present invention showing a cup-holder insert with first and second laterally projecting food receptacle portions.

Referring to FIGS. 1 through 4 there is illustrated a first embodiment of a cup-holder insert which is constructed in accordance with the present invention which is particularly suitable for adapting a cup-holder to accommodate a combo meal including a sandwich on a round sandwich roll, a drink, and french fries. In this connection it is noted that the inventive cup-holder insert 10 includes generally a centrally located support member 12 defining a first cavity 14 adapted to receive a cup as well as a first laterally projecting food receptacle portion 16 defining a second cavity 18 adapted to receive victuals and a second laterally projecting food receptacle portion 20 defining a third cavity 22 for receiving victuals as shown in FIG. 1. Note that cavity 18 is generally rectangular in cross-section as would be suitable, for example, for french fries, whereas cavity 22 generally cylindrical in shape as would be suitable, for example, to accommodate a round sandwich roll.

As will be appreciated from FIGS. 1 through 4, cup-holder insert 10 has a plurality of cavities such as cavities 14, 18, and 22 which extend the usefulness of a cup-holder in which it is placed. In the embodiment shown in FIGS. 1 through 4 the centrally located support member 12 most preferably includes a relatively flat bottom 24 and the upwardly and outwardly projecting first conical segment 26 and upwardly and outwardly projecting second conical section 28 as well as an upper conical section 30. Cavity 14 optionally has an open bottom, that is, open at 24 so that it is stable on a surface, such as a flat surface, when the insert is used independently, that is, without a cup-holder. Typically bottom 24 is circular and has a diameter of about 2½ inches or so, whereas the transitional section 28 has a diameter at its lower portion of about 3, inches and a diameter at its upper portion of about 4¼ inches. The upper most inner diameter of the central cavity which is configured to receive the drinking cup, may have an inside diameter of 4½ inches or so. A first food receptacle portion such as portion 16, generally has a flat bottom, such as bottom 32, and four opposing sidewall segments, 34, 36, 38 and 40. As can be seen from the Figures, portion 16 is of generally rectangular cross section wherein opposing walls 40 and 36 are slightly arcuate. So also as can be appreciated from FIG. 2 in particular, the sidewalls slope upwardly and outwardly with respect to flat bottom 32. Portion 20 includes a pair of opposed sidewall segments 42 and 44 which are adjacent arcuate bottom 46. Thus, portion 20 is hemicylindrical in shape as shown and is particularly adapted, for example, to receive a round bun. As will be appreciated from the Figures, the cup-holder inserts, particularly the central support member 12 is frustoconical in shape and configured such that when placed in an ordinary cup holder (i.e. generally simply a flat supporting plate with a round hole, such as cup-holder 48, shown schematically in FIG. 2) the first sidewall 50 of support member 12 projects upwardly with respect to cup-holder 48.

Figure 2:
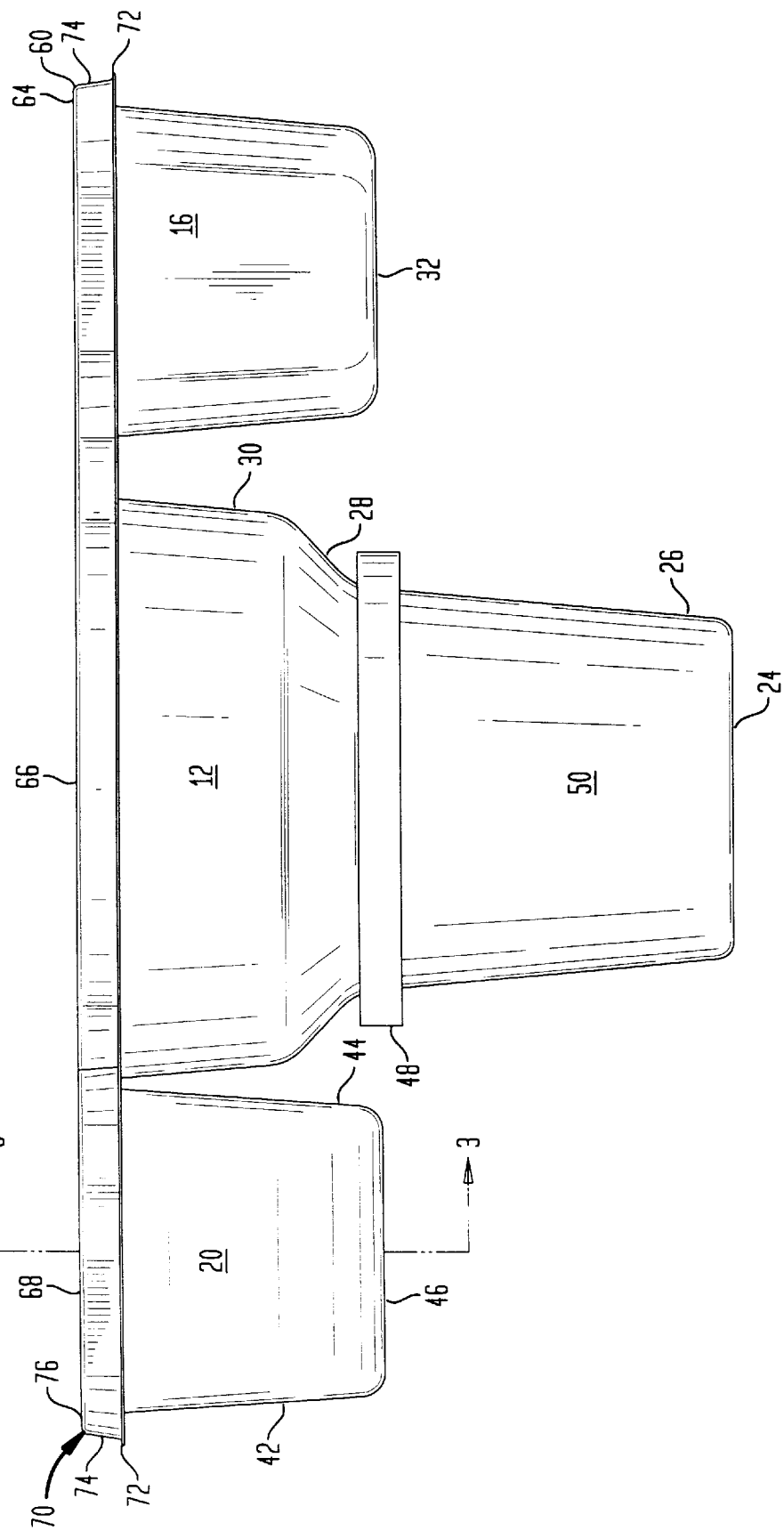
FIG. 2 is a view in elevation along the side of the cup-holder insert of FIG. 1 mounted in a conventional cup-holder.

When mounted in cup-holder 48 support member 12 typically projects upwardly from the cup-holder as shown in FIG. 2. Member 12 typically seats in cup-holder 48 at transitional section 28. Food receptacle portions 16, 20 project laterally from support member 12 at an elevation above cup-holder 48 as shown.

The support member of generally circular cross-section 12 when disposed in cup-holder 48, thus projects upwardly with respect to the cup-holder and defines a first cavity 14 adapted to receive a cup. The support member 12 has laterally projecting food receptacle portions adapted to hold victuals such as a snack, or a combo meal. Most preferably the cup-holder insert in some embodiments includes both a first and second food receptacle portion.

Various means may be employed to increase the rigidity of the cup-holder insert of the present invention, including using stiffer filled plastic compositions optionally including reinforcing fiber, ribs or the like or corrugated geometries. One convenient method is to employ a multi-faceted rim as shown, for example, in FIGS. 1–4. Referring to FIG. 2, it can be seen that rim 70 includes an outer lip 72 as well as a downwardly projecting portion 74, and a flat top portion 76 adjacent the sidewalls of the food receptacle portions 16, 20.

Figure 4:
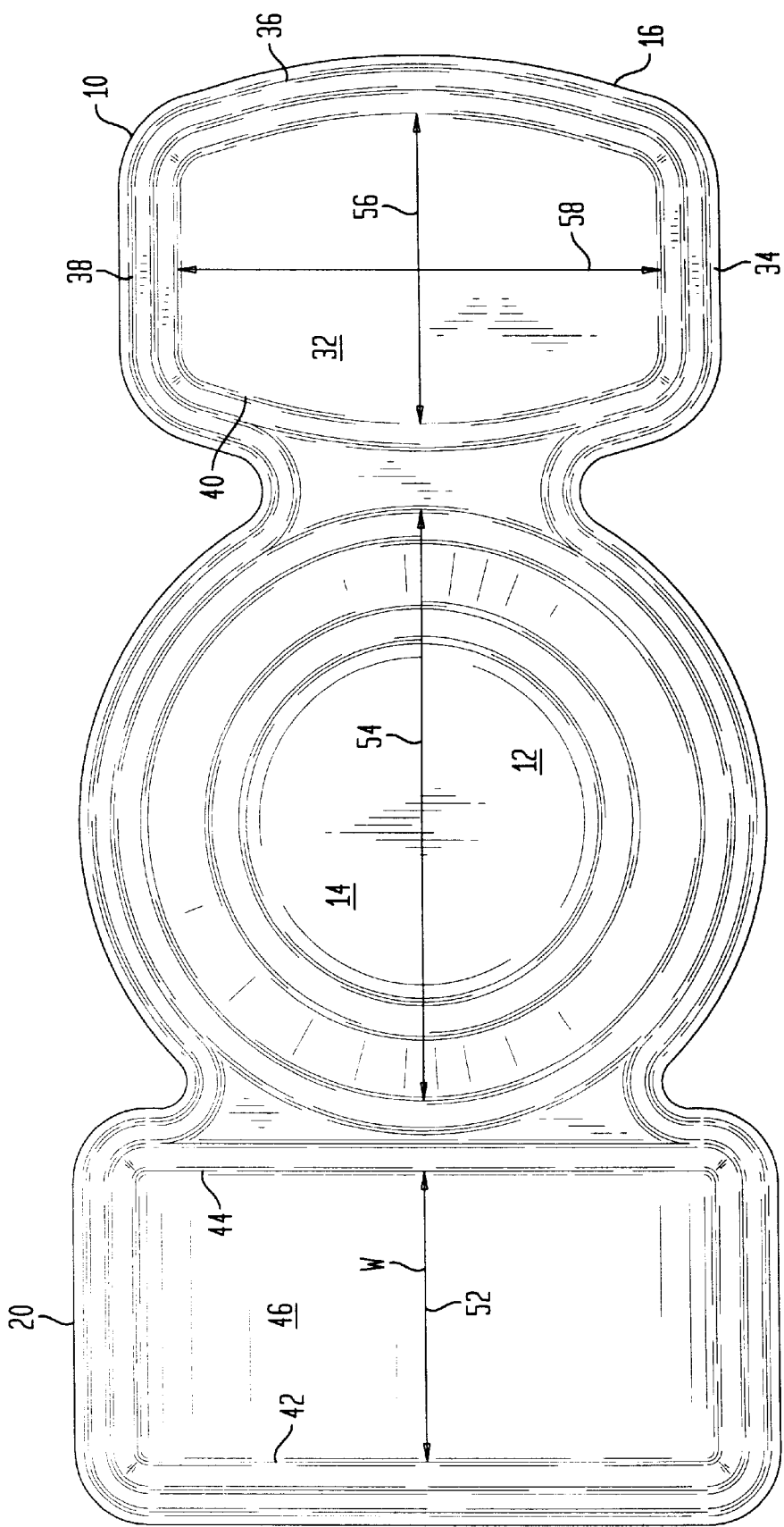
FIG. 4 is a top view of the cup-holder insert of FIG. 1.

As will be appreciated from FIG. 4 portion 20 being hemicylindrical in shape has a cylindrical axis 52 extending thereacross. Cylindrical axis 52 is coextensive with a line 54 bisecting the mouth of the central cavity of the support member. Typically, walls 42 and 44 are spaced apart at a width, W, which is along with axis 52 as shown in FIG. 4 a distance of from about 1 to about 4 inches. That is the axial width of portion 20 is from about 1 to 4 inches; preferably about 2 inches or so to accommodate a sandwich bun. FIG. 4 also shows that portion 16 of insert 10 being generally rectangular in nature has a minor axis 56 and a major axis 58. The internal dimensions along the minor axis of cavity 18 are generally from about 1¾ to about 3 inches whereas the internal dimensions of cavity 18 along major axis 58 are from about 3 to 4.5 inches. The minor axis 56 is coextensive with line 54 bisecting the mouth of cavity 14.

The particular arrangement minimizes the lateral distance involved in forming suitable receptacle portions for the various food items desired to supported by the inventive insert.

Figure 3:
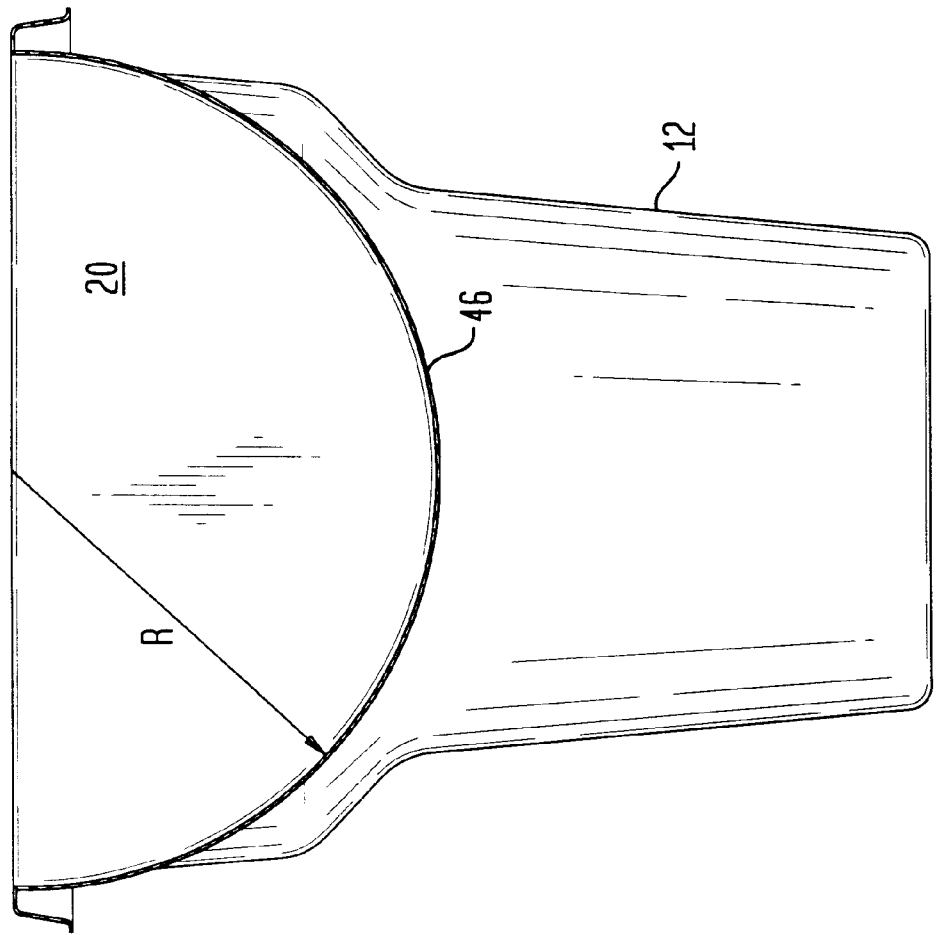
FIG. 3 is an end view in elevation and partially in section of the cup-holder insert of FIG. 2 along line 3—3 illustrating the hemicylindrical food receptacle portion adapted to receive a sandwich roll.

As will be appreciated from FIG. 3, arcuate bottom 46 is upwardly concave and has a radius of curvature, R, of from about 1¾ to about 2¾ inches. Typically the radius of curvature of bottom 46 is about 2¼ inches.

As noted earlier, the inventive cup-holder insert may be formed of a variety of materials. It may be ribbed to provide strength or the various lips and folds may provide sufficient strength depending upon such as folds and lips shown at 60 and 72 may provide sufficient strength depending on wall caliper. Very generally, the wall caliper may be from about 10 to about 100 thousandths of an inch (mils), or maybe less or greater if reinforcing ribs are included in a particular design as would be within the skill of one versed in the art. A wall caliper of about 10–50 mils is typical.

It will be further appreciated in FIG. 2 that the top 64 of portion 16 is substantially coplanar with top 66 of central cavity 14, which in turn is substantially coplanar in with the top 68 of cavity 22. Thus, the various top portions being coplanar function as an extended tray.

Figure 5:
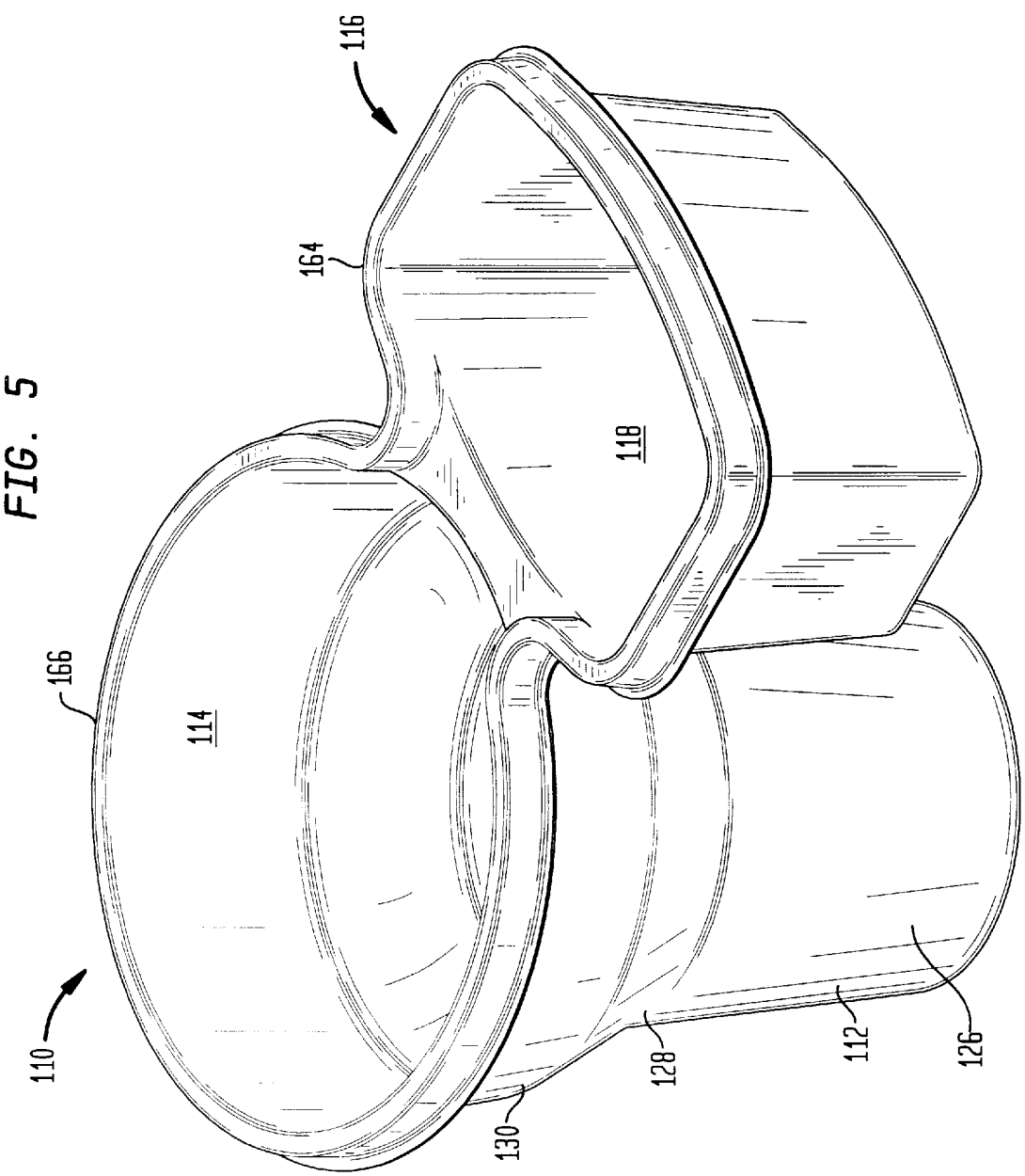
FIG. 5 is a view in perspective of another embodiment of a cup-holder insert produced in accordance with the present invention showing a food receptacle portion of generally cylindrical cross-section with a pair of curved and opposed sidewalls as well as a first cavity adapted to receive a drinking cup.

There is shown in FIG. 5 yet another embodiment of the inventive cup-holder insert. In FIG. 5 insert 110 consists essentially of central support member 112 defining a first cavity 114 and a first laterally projecting portion 116 defining a second cavity 118 for receiving a snack, such as french fries. Central support member 112 is generally configured as the corresponding part in FIGS. 1 through 4 whereas portion 116 is also configured as in FIGS. 1 through 4 bearing similar parts. Corresponding parts are numbered 100 numerals higher. Thus, top 164 of portion 116 is substantially coplanar with top 166 of cavity 114. So also support member 112 has first, second and third frustoconical sections 126, 128 and 130 as noted above. The embodiment of FIG. 5 is particularly suitable and is desired simply to have a cup-holder insert that will transform an ordinary cup-holder into a holder for a drink and french fries, for example, or a holder for a drink, and change and the like. The embodiment of FIG. 5 is particularly suitable for vehicles which do not include such accommodations.

There is shown in FIGS. 6 through 10 another embodiment of the inventive cup-holder insert 210 which includes generally a central support member 212 defining a first cavity 214 for receiving a cup as well as a first food receptacle portion 216 of a generally rectangular shape as described above. Portion 216 defines a second cavity 218.

The cup-holder shown in FIGS. 6 through 10 further comprises a second food receptacle portion 220 which defines a third cavity 222. The central cavity 214 may have an open bottom (indicated at 224 on FIGS. 6–8) which might further be useful if it was desired, for example, to use the insert on table top and not in a cup-holder.

Here again, the central support member has a first frustoconical section 226 as well as a second frusto-conical section 228 and an upper conical section 230 as shown in the Figures.

Portion 216 has a flat bottom 232 such that the compartment may be used for holding, french fries for example, as well as a plurality of opposed sidewalls, 234, 236, 238, and 240. Portion 220 on the other hand has a pair of opposed sidewalls 242, 244 as well as an arcuate bottom 246 similar to the hemicylindrical compartment described in connection with the embodiment of FIGS. 1 through 4.

Figure 6:
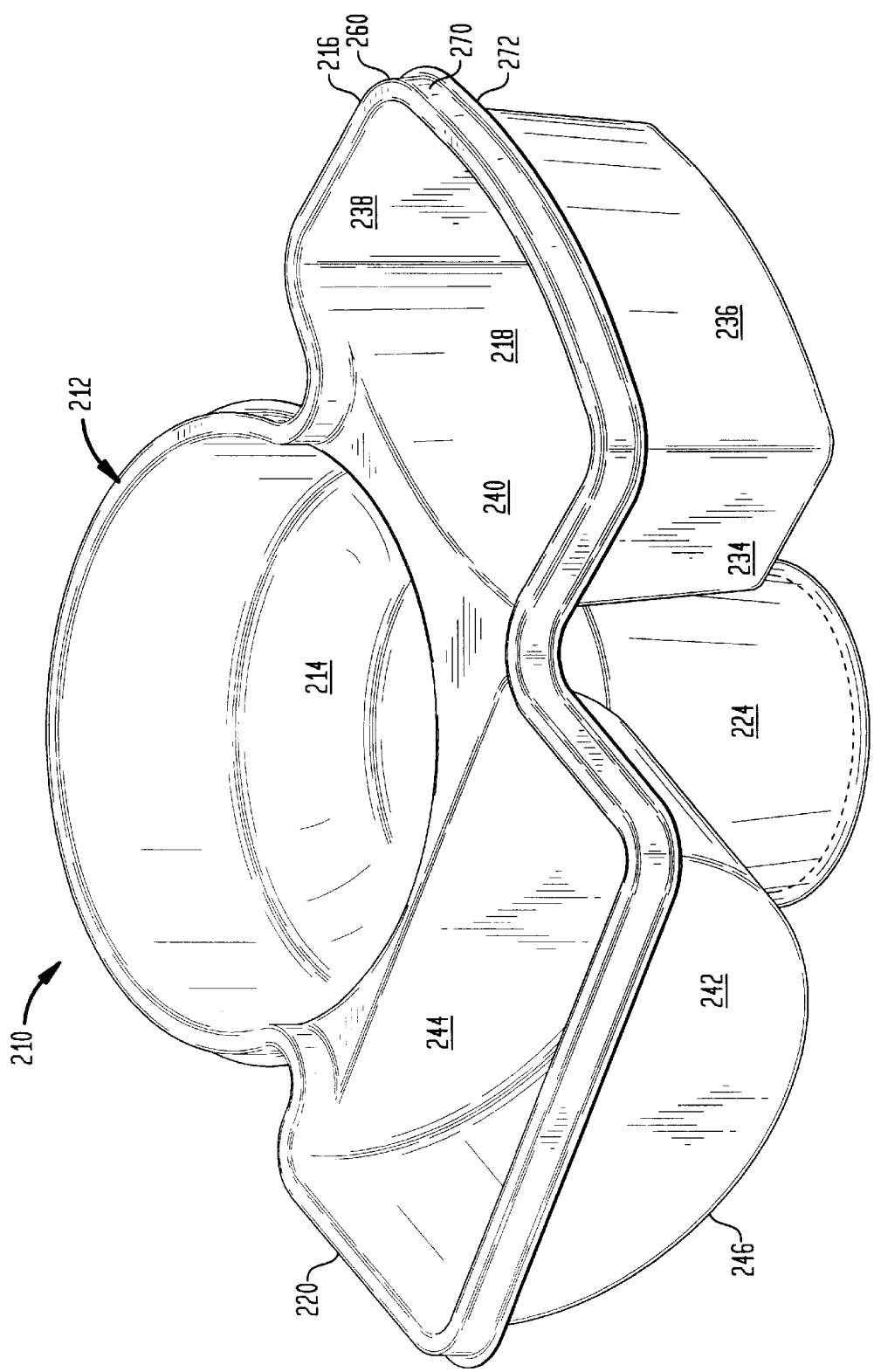
FIG. 6 is a perspective view of yet another embodiment of the present invention showing a cup-holder with first and second laterally projecting food receptacle portions that are angularly offset with respect to one another.
Figure 7:
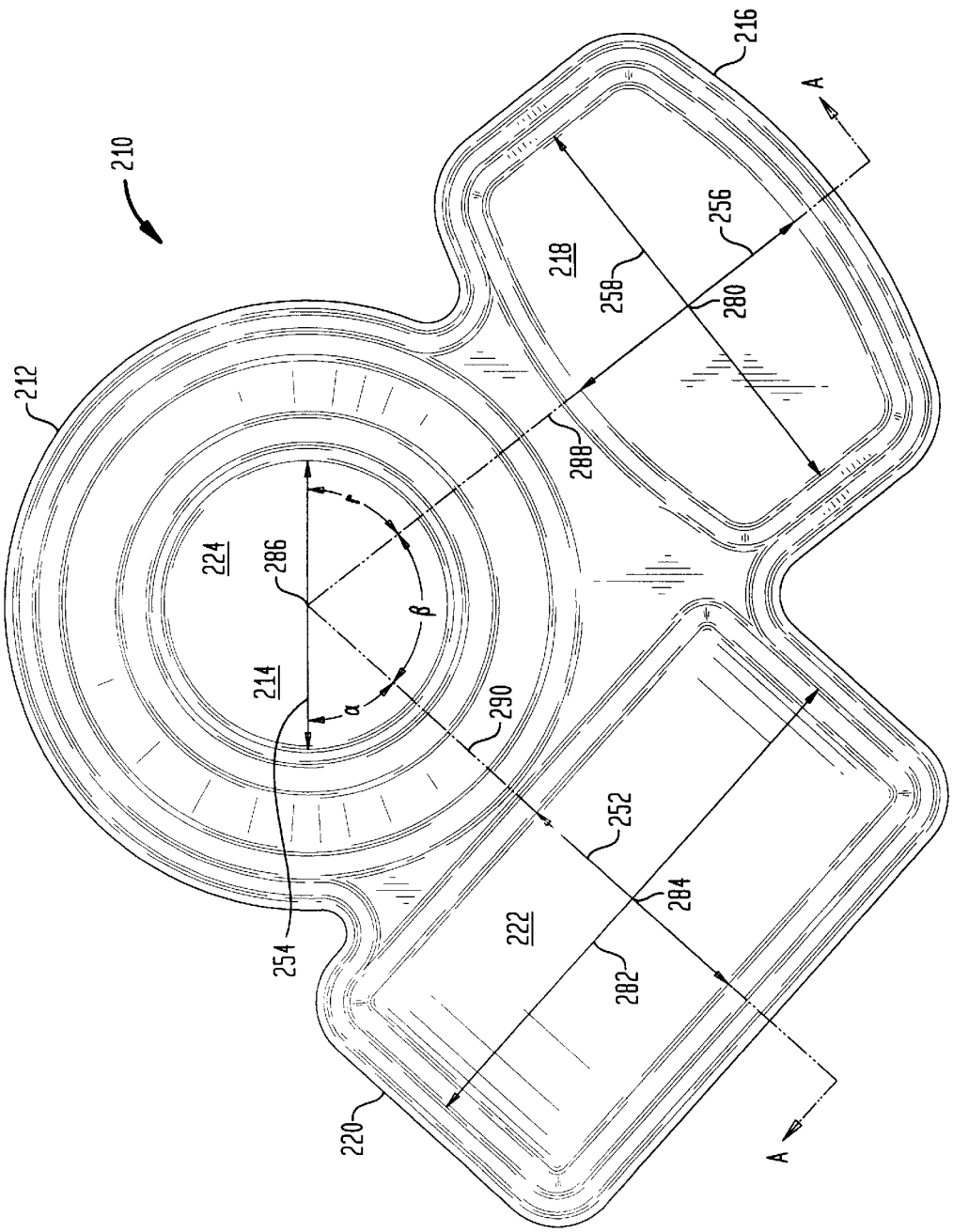
FIG. 7 is a top view of the cup-holder insert of FIG. 6.

In the embodiment shown in FIGS. 6 through 10 the laterally projecting food compartments are angularly offset from one another by an angle β as shown in FIG. 7. It will be appreciated from FIG. 7 that the various angles can be described by reference to the cavities in the food receptacle portions and central cavity 214 of the cup-holder insert. For example, cavity 218 has a minor axis 256 and a major axis 258 both of which go through a center point 280. Likewise, portion 220 has a hemi-cylindrical 252 axis as well as a diameter 282 which go through a center point 284. Center points 280, 284 may actually be any convenient point along the central axis of the respective cavity. The central support member 212 defines a cylindrical cavity having a central axis 286 which lies on a line 254 which bisects the cavity. The line along the minor axis of portion 216 through point 280 to the cylindrical axis 286 of cylindrical member 212 is shown in the diagram as line 288. Likewise a line along hemispherical axis 252 through center 284 directed to central axis 286 of support member 212 is shown as line 290. The included angle β is the degree to which the two cavities are said to be angularly offset across the central cavity as that terminology is used herein. That is to say, without limitation, two cavities are said to be angularly offset with respect to one another at an angle β, if the included angle between lines drawn from their geometric centers (as viewed from the top) to the geometric center of the central cavity (e.g., axis 286 of cavity 214) of the cup holder is the angle β. For example, in the particular embodiment shown in FIG. 6 and following, the angle β is roughly 80° whereas other angles α and γ are roughly 50°. That is to say line 29 makes an angle with line 254 of about 50° and line 288 makes an angle γ of about 50° with line 254 as well. Thus, the remaining angle β the degree to which the two food compartments are angularly offset from one another is an angle of about 80° in the particular embodiment shown.

When an insert with three compartments is used the two laterally projecting food compartments may be angularly offset at any suitable value. Typically the laterally projecting compartments are angularly offset by an amount of from about 60 to about 100°, preferably from about 70 to about 90° with an angle of about 80° being preferred in some circumstances. That is to say β is from about 70° to 90° in a preferred range with about 80° being particularly preferred in some embodiments.

The cup-holder insert of FIGS. 6 through 10 is in many respects quite similar to the cup-holder insert or FIGS. 1 through 4 and the cup-holder insert of FIG. 5. That is to say, the cup-holder insert is configured to vertically reside in the cup-holder 48 (FIG. 2) of an automobile for example when placed therein such that the rim 270 is upwardly disposed. Likewise, the cup-holder insert of FIGS. 6 through 10 may be integrally made of plastic material such as high impact polystyrene having a wall thickness of from about 10 to about 100 thousandths of an inch (mls). So also it can be seen from FIG. 8 that the rim 270 has folds 260 as well as lip 272 for strength.

Figure 8:
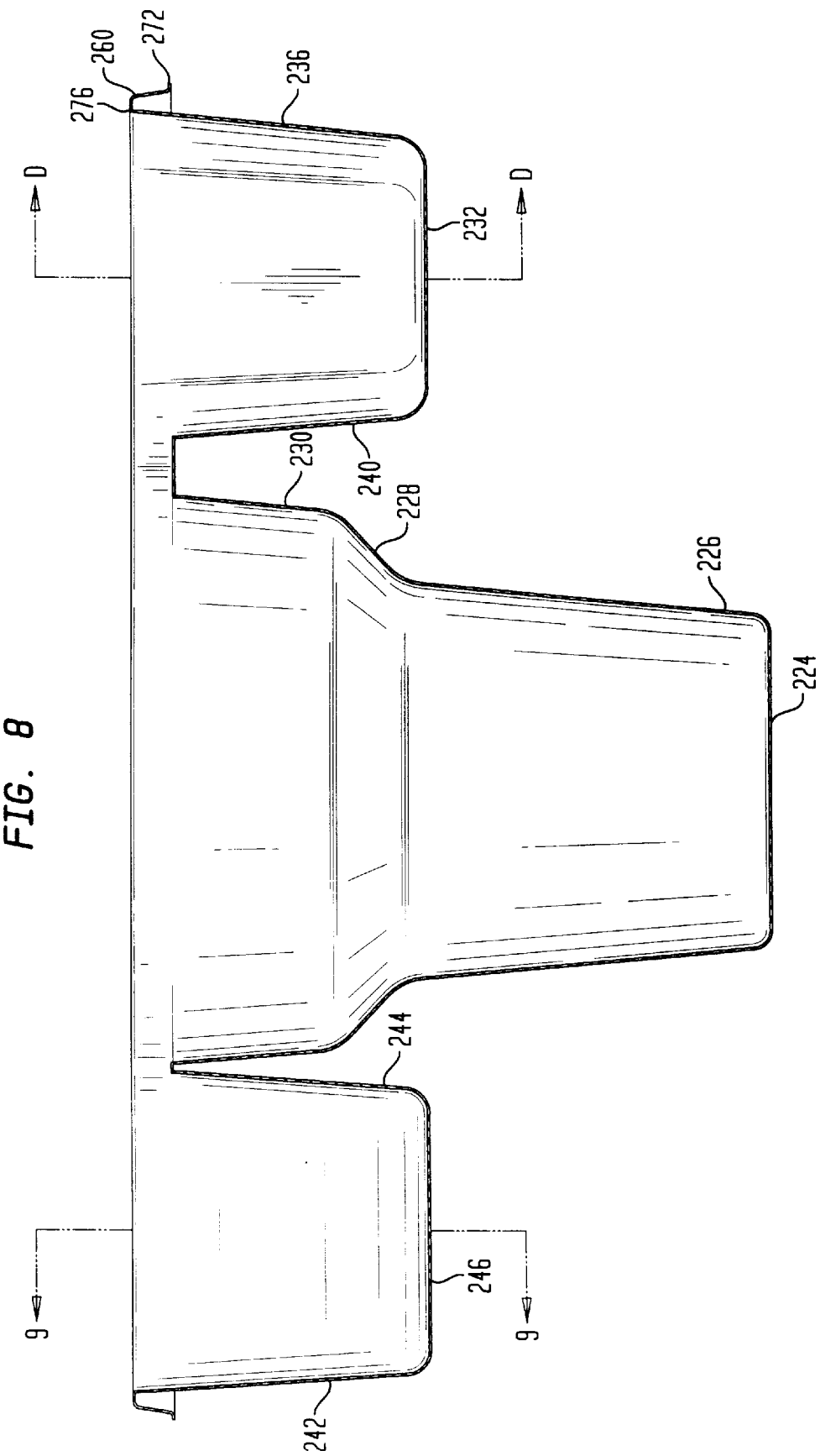
FIG. 8 is a view in elevation and section of the cup-holder insert of FIG. 6 along lines A—A of FIG. 7.
Figure 9:
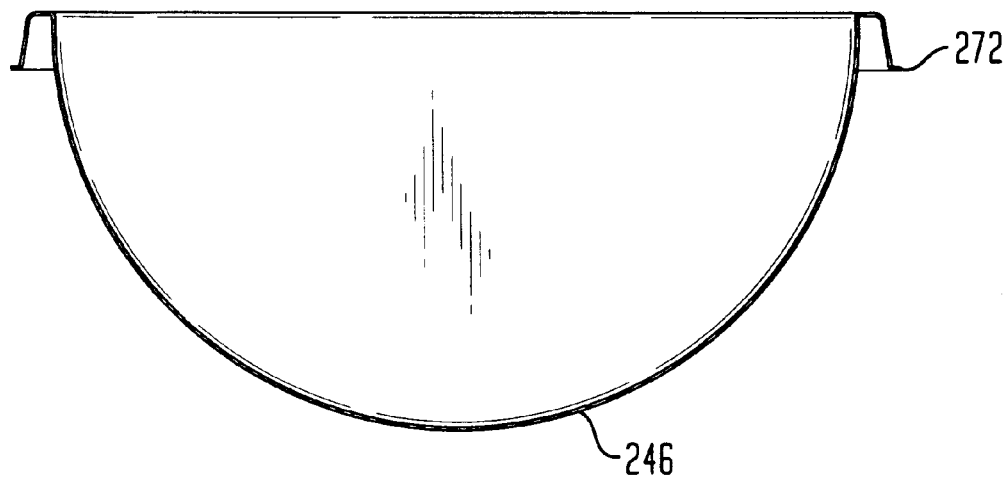
FIG. 9 is a partial view in elevation and section of the cup-holder insert of FIG. 6 along line 9—9 of FIG. 8.
Figure 10:
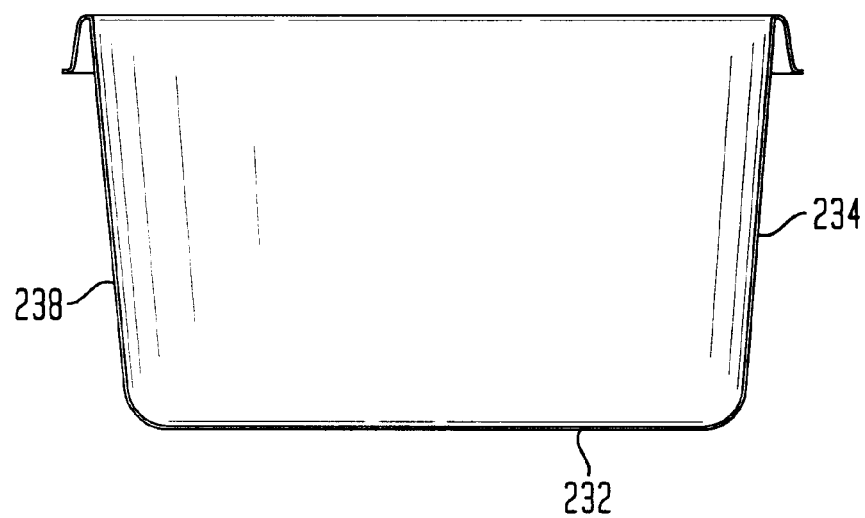
FIG. 10 is a partial view in elevation and section of the cup-holder of FIG. 6 along line D—D of FIG. 8.

It should be clear from the various diagrams, FIG. 7 is a top view of the cup-holder insert of FIG. 6 whereas FIG. 8 is a view along line A—A of FIG. 7 showing the various features of the cup-holder insert whereas FIGS. 9 and 10 are views in section and elevation along lines 9—9 and D—D respectively of FIG. 8.

Figure 11:
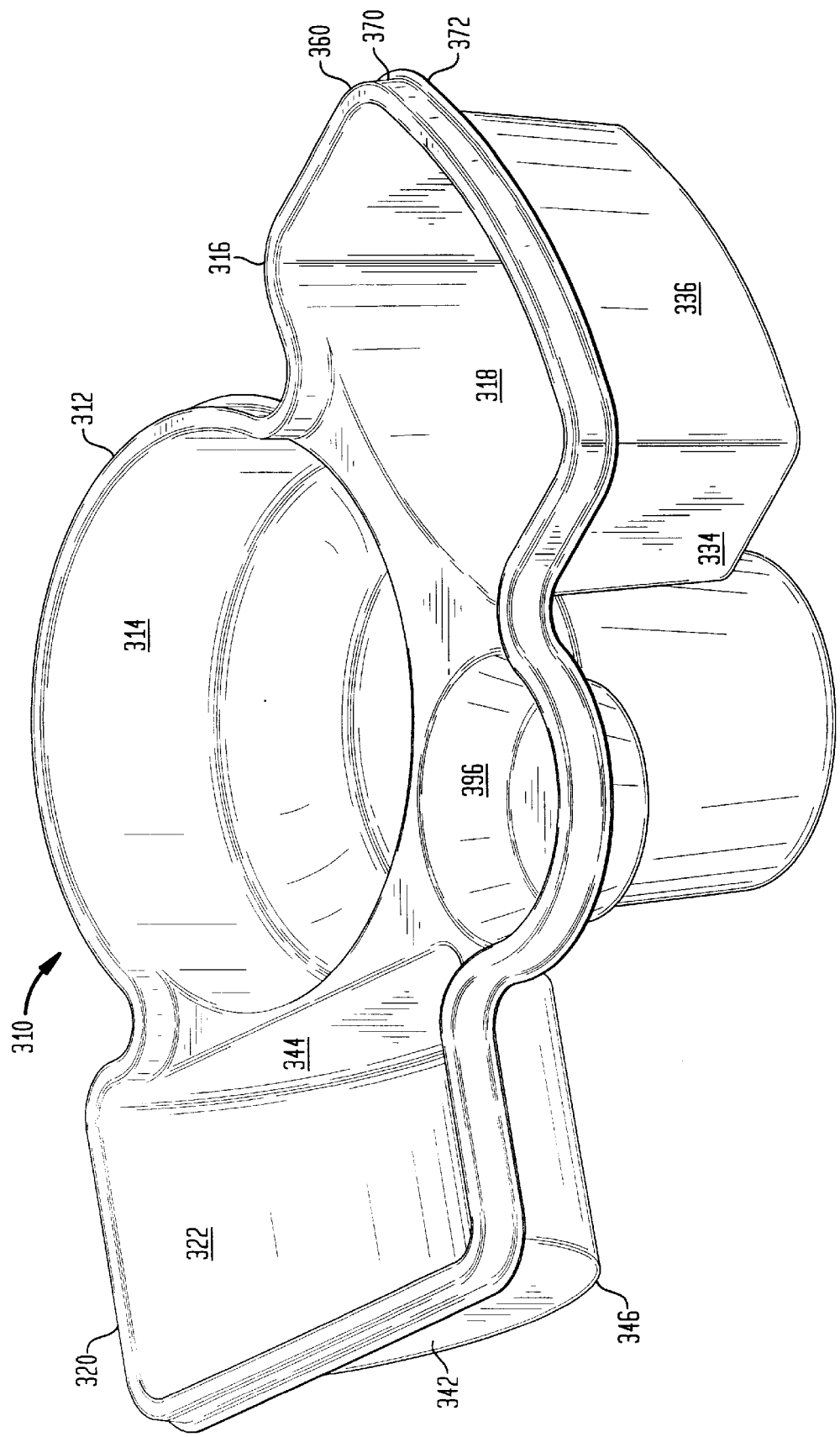
Figure 12:
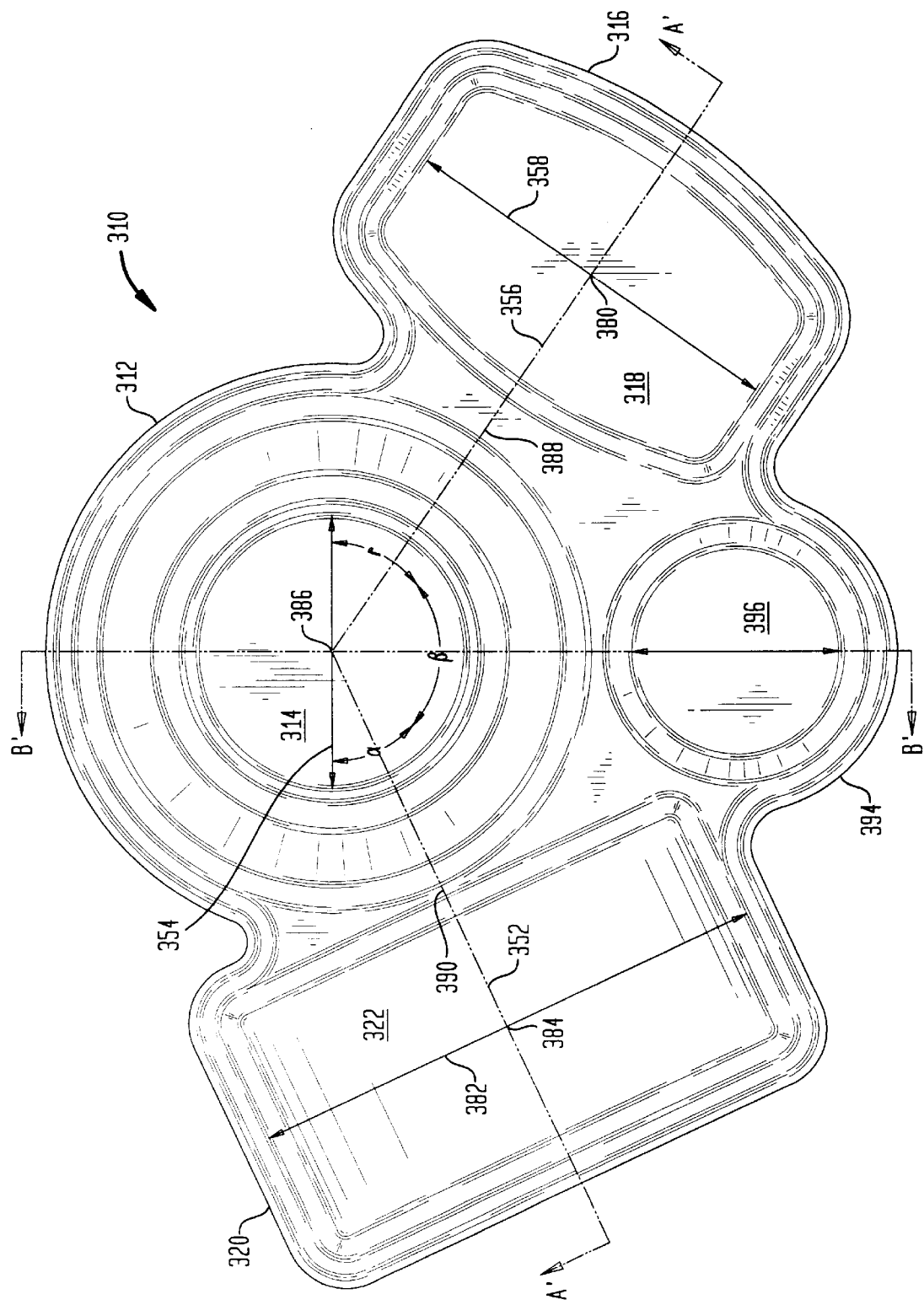
FIG. 12 is a top view of the cup-holder insert of FIG. 11.
Figure 13:
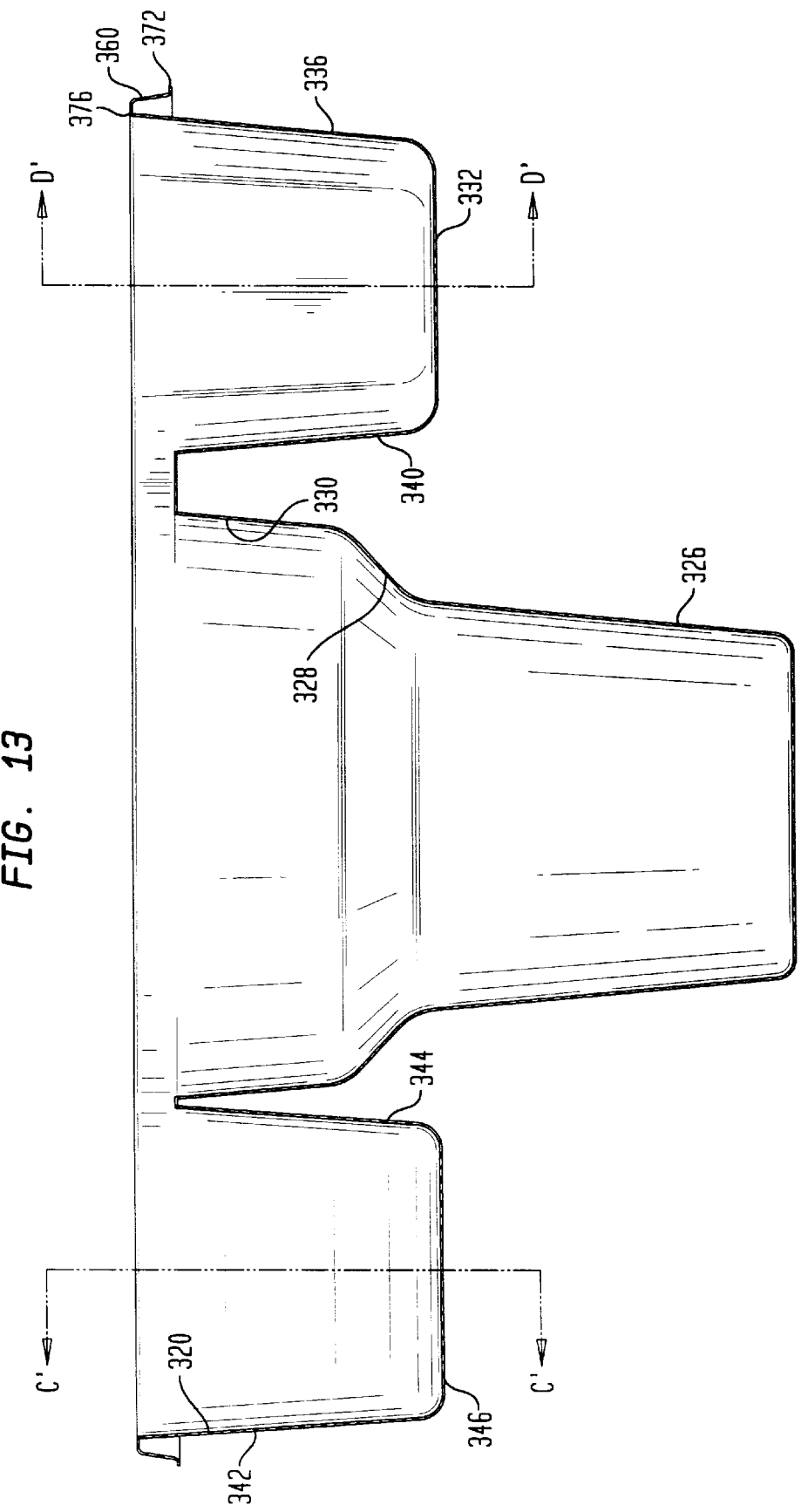
FIG. 13 is a view in elevation and section of the cup-holder insert of FIG. 11 along line A'—A' of FIG. 12.
Figure 14:
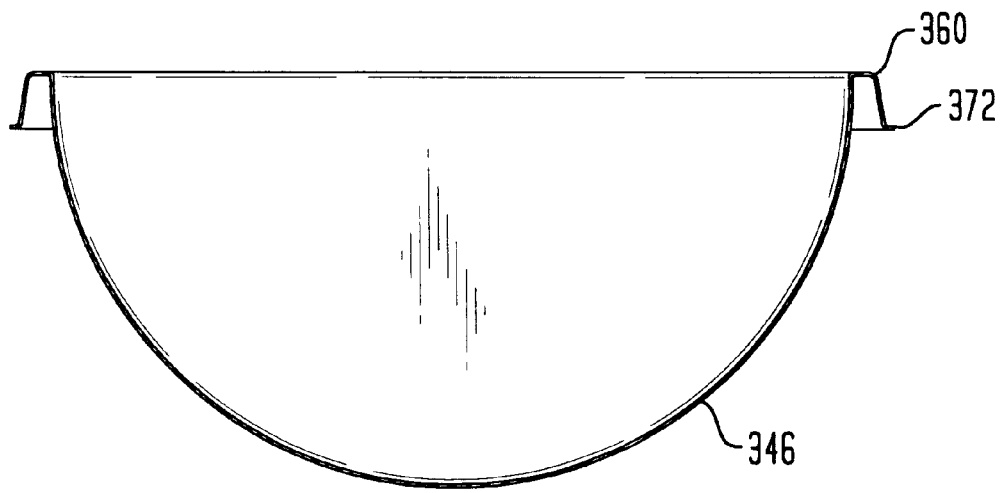
FIG. 14 is a partial view in elevation and section of the cup-holder insert of FIG. 11 along line C'—C' of FIG. 13.
Figure 15:
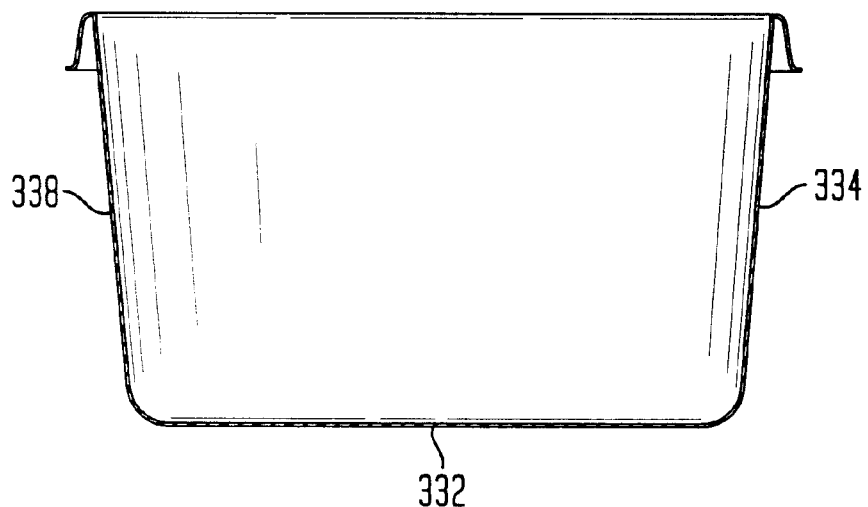
FIG. 15 is a partial view in elevation and section of the cup-holder insert of FIG. 11 along line D'—D' of FIG. 13.
Figure 16:
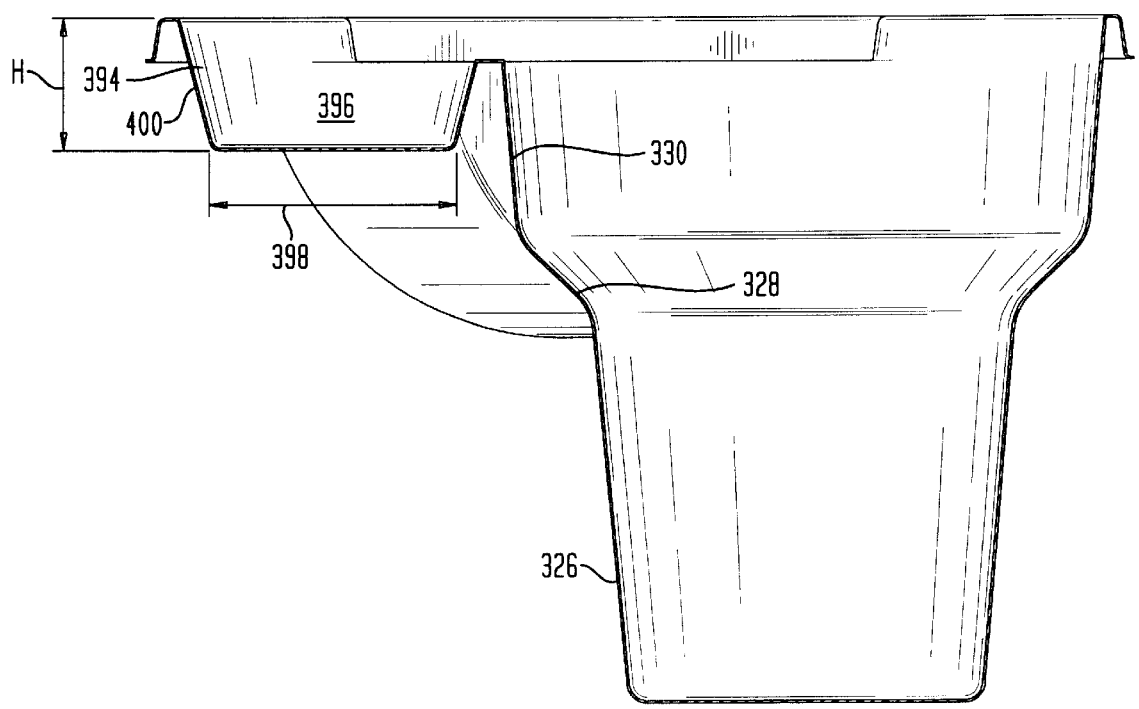
FIG. 16 is a partial view in elevation and section of the cup-holder insert of FIG. 11 along line B'—B' of FIG. 12 showing in detail the third food receptacle portion.

A still yet further embodiment of the present invention is shown in FIGS. 11 through 16. FIG. 11 is a view in perspective of a four compartment cup-holder insert constructed in accordance with the present invention wherein there is provided a central cylindrical cavity for receiving a cup, a rectangular food compartment with a flat bottom for receiving french fries for example, a laterally projecting food receptacle portion with a cylindrical bottom as described above in connection with other embodiments, wherein there is further provided between the two larger laterally projecting food compartments a smaller cavity for receiving a sauce cup, for example. The extra compartment is useful for small cups of the type used for ketchup or other condiments.

In particular, there is shown in FIGS. 11 through 16 a cup-holder insert 310 including a centrally located support member 312 configured to reside vertically in a cup-holder as described above. Central support member 312 is generally cylindrical and defines a first cavity 314 for receiving a cup, for example. Laterally projecting from support member 312 is a first food receptacle portion 316 which defines another cavity 318. Cavity 318 is of suitable dimensions for receiving french fries as described in connection with previous embodiments. A second laterally projecting food receptacle portion 320 is angularly offset from portion 316 again by an angle β as described above. The embodiment of FIGS. 11 through 16 differs from the embodiment of FIGS. 6 through 10 in that there is additionally provided a third food receptacle portion 394 defining a fourth cavity 396. Portion 394 is again integrally formed with the other laterally projecting food receptacle portions and is dimensioned to hold a sauce cup for example such as would be used to serve ketchup or another condiment. The particular dimensions of cavity 396 are perhaps better appreciated by reference to FIG. 16 wherein it is shown that cavity 396 has a lower diameter 398 which may be about 2 inches or so and a height 400 which may be about ¾ inches or so. In general, cavity 396 would be cylindrical in shape and have a diameter of anywhere between about 1.5 inches and 2.5 inches and a height, H, of anywhere between about 0.5 to about 1 inch.

It will be appreciated from the various Figures that the embodiment shown in FIGS. 11 through 16 resembles those described above and it should be noted that the corresponding parts are numbered 100 numerals higher for the purposes of explanation as well as brevity. Thus it will be appreciated that first cavity 314 is generally cylindrical in shape whereas portion 316 defines a second cavity 318 which is generally rectangular as would be appropriate for example for receiving french fries. Second laterally projecting food receptacle portion 320 defines a third cavity 322 which is generally hemicylindrical in shape as described above. Support member 312 has a first conical section 326, a second conical section 328 as well as an upper conical segment 330. Portion 316 has a generally flat bottom 332 and a plurality of sidewalls 334, 336, 338, and 340. Food receptacle portion 320 includes sidewalls 342, 344 as well as an arcuate bottom 346. As will be appreciated from FIG. 12, portion 320 forms a hemispherical cavity having a cylindrical axis 352 which goes through the center point 384 of cavity 322 as shown in the diagram. That is to say axis 352 will intersect with the diameter 382 passing through the central point 384 of the hemispherical cavity.

Portion 316 defining cavity 318 is generally rectangular in shape and includes a minor axis 356 as well as a major axis 358 which intersect at the center point 380 of the cavity.

The support member 312 defines cavity 314. A line 354 bisecting the mouth of central cavity 314 intersects a cylindrical axis 386 which along the central line of the cavity. If one was to draw a line along axis 356 and join it to axis 396, one would generate the line shown as 388. Likewise if one was to draw a line through the center point 384 of portion 320 to central axis 386 of cavity 314 one generates line 390. The included angle, β between lines 390 and 388 is referred to herein as the included angle between the receptacle portions or the degree to which the laterally projecting food receptacle portions (or cavities) are angularly offset from one another as described above in connection with the embodiment of FIGS. 6 through 10. In the embodiment shown in FIGS. 11 through 16, the included angle β or the degree to which the laterally projecting food receptacle portions are angularly offset from one another is about 120°. In a typical embodiment including four cavities, that is to say, a central cavity for receiving a drinking cup and three food receptacle portions, included angle β may be in general anywhere from about 90 to about 160°. Of course one might choose to specify the angular relationships differently or with more particularity with respect to different portions, for example, one could specify angle α between line 354 bisecting the mouth of the central cavity and line 394 one could likewise define an angle γ between line 388 and line 354. The particular embodiment shown α would have a value of about 25° whereas γ would be typically around 35°. Of course one might adjust the particular angles employed depending on the particular products sought to be accommodated by the inventive cup-holder insert.

While the present invention has been described in connection with several embodiments, modifications within the spirit and scope of the present invention, set forth in the appended claims, will be readily apparent to those of skill in the art.

What is claimed is:

1. A compact cup-holder insert comprising:

(a) a support member of generally circular cross-section configured to be disposed in a cup-holder and reside vertically in said cup-holder when placed therein and which defines a first cavity adapted to receive a cup;

(b) at least a first laterally projecting food receptacle portion thereof which projects laterally from said support member when said insert is placed in said cup-holder, said first laterally projecting food receptacle portion defining a second upwardly concave substantially hemicylindrical cavity with an arcuate bottom adapted to receive victuals, with the provisos:

(c) that said cup-holder insert defines a single circular central cavity for receiving a cup characterized in that it defines a diameter, D, at its upper portion; and (d) that the laterally projecting food receptacle portions are configured such that their cavities extend laterally a distance less than the diameter, D, of the central cavity.

2. The cup-holder insert according to claim 1, further comprising at least a second laterally projecting food receptacle portion thereof which projects laterally from said support member;

said second laterally projecting food receptacle portion defining a third cavity for receiving victuals.

3. The cup-holder insert according to claim 2, wherein the top of said second cavity is substantially coplanar with the top of said second cavity which, in turn, is substantially coplanar with the top of said third cavity.

4. The cup-holder insert according to claim 2, wherein said second laterally projecting food receptacle portion is angularly offset with respect to said first laterally projecting food receptacle portion at an angle of from about 60 degrees to about 140 degrees.

5. The cup-holder insert according to claim 1, wherein said insert is integrally formed of a plastic material.

6. The cup-holder insert according to claim 5, wherein said insert is formed by way of deep-draw thermoforming.

7. The cup-holder insert according to claim 6, wherein said plastic material has a wall caliper of from about 10 mils to about 30 mils.

8. The cup-holder insert according to claim 5, wherein said plastic material is high impact polystyrene.

9. The cup-holder insert according to claim 5, wherein said plastic material has a wall caliper of from about 10 mils to about 100 mils.

10. The cup-holder insert according to claim 1, wherein said hemicylindrical cavity has a width of from about 1 inch to about 4 inches.

11. The cup-holder insert according to claim 10, wherein said hemicylindrical cavity has a width of about from about 1.5 to about 3 inches.

12. The cup-holder insert according to claim 1, wherein the cylindrical axis of said hemicylindrical cavity is substantially coextensive with a line bisecting the mouth of said first cavity.

13. The cup-holder insert according to claim 1, wherein said arcuate bottom of said hemicylindrical cavity has a radius of curvature of from about 1¾ inches to about 2¾ inches.

14. The cup-holder insert according to claim 1, wherein the top of said second cavity is substantially coplanar with the top of said first cavity.

15. The cup-holder insert according to claim 1, wherein said first cavity is truncated such that it has an open bottom.

16. A compact cup-holder insert comprising:
(a) a support member configured to be disposed in a cup-holder having a first segmented frustoconical sidewall including a lower frustoconical section, a transitional frustoconical section and an upper frustoconical section, wherein said upper frustoconical section projects upwardly with respect to said cup-holder when placed therein,
said first sidewall defining a first cavity adapted to receive a beverage cup;
(b) at least a first laterally projecting food receptacle portion which projects laterally from said upper frustoconical section when said insert is placed in said cup-holder;
said first laterally projecting food receptacle portion defining a second cavity adapted to receive victuals, with the provisos:
(c) that said cup-holder insert defines a single circular central cavity for receiving a cup characterized in that it defines a diameter, D, at its upper portion;
(d) that the laterally projecting food receptacle portions are configured such that their cavities extend laterally a distance less than the diameter, D, of the central cavity; and
(e) that the laterally projecting food receptacle portions extend downwardly to at least about the transitional frustoconical section.

17. The cup-holder insert according to claim 16, further comprising at least a second laterally projecting food receptacle portion thereof which projects laterally from said upper frustoconical section of said support member at an elevation above said cup-holder when said insert is placed therein
said second laterally projecting food receptacle portion defining a third cavity for receiving victuals.

18. The cup-holder insert according to claim 17, wherein said insert is integrally formed of a plastic material.

19. The cup-holder insert according to claim 18, wherein said insert is formed by way of deep-draw thermoforming.

20. The cup-holder insert according to claim 18, wherein said plastic material is polystyrene.

21. The cup-holder insert according to claim 18, wherein said plastic material has a wall caliper of from about 10 mils to about 100 mils.

22. The cup-holder insert according to claim 18, wherein said plastic material has a wall caliper of from about 10 mils to about 30 mils.

23. The cup-holder insert according to claim 16, wherein said first laterally projecting food receptacle portion has an arcuate bottom adapted to receive a round sandwich roll.

24. A compact cup-holder insert comprising:
(a) a support member of generally circular cross-section configured to be disposed in a cup-holder and reside vertically in said cup-holder when placed therein and define a first cavity adapted to receive a cup;
(b) al least a first laterally projecting food receptacle portion thereof which projects laterally from said support member when said insert is placed in said cup-holder, said first laterally projecting food receptacle portion defining a second cavity adapted to receive victuals; and
(c) at least a second laterally projecting food receptacle portion thereof which projects laterally from said support member when said insert is placed in said cup-holder;
said second laterally projecting food receptacle portion defining a third cavity for receiving victuals, and further wherein said second laterally projecting food receptacle portion is disposed opposite said first laterally projecting food receptacle portion with the provisos:
(d) that said cup-holder insert defines a single circular central cavity for receiving a cup characterized in that it defines a diameter, D, at its upper portion; and
(e) that the laterally projecting food receptacle portions are configured such that their cavities extend laterally a distance less than the diameter, D, of the central cavity;
said first laterally projecting flood receptacle portion has a generally rectangular cross-section with four opposing sidewall segments configured such that the minor axis of said second cavity is substantially coextensive with a line bisecting the mouth of said first cavity and has a length of form about 1¾ inches to about 3 inches, said second cavity being provided with a substantially flat bottom, as well as a major axis of from about 3 inches to about 4.5 inches; and
wherein further said second laterally projecting food receptacle portion defines an upwardly concave substantially hemicylindrical cavity provided with an arcuate bottom.

25. The cup-holder insert according to claim 24, wherein the cylindrical axis of said hemicylindrical cavity is substantially coextensive with a line bisecting the mouth of said first cavity.

26. The cup-holder insert according to claim 24, wherein said arcuate bottom of said hemicylindrical cavity has a radius of curvature of from about 1¾ inches to about 2¾ inches.

27. The cup-holder insert according to claim 24, wherein said hemicylindrical cavity has a width of from about 1 inch to about 4 inches.

28. The cup-holder inset according to claim 27, wherein said hemicylindrical cavity has a width of from about 1.5 to about 3 inches.

29. A compact cup-holder insert comprising:
(a) a support member of generally circular cross section configured to be disposed in a cup-holder and reside vertically in the cup-holder when placed therein and which defines a first cavity adapted to receive a cup;
(b) at least a first laterally projecting food receptacle portion which projects laterally from the support member when the insert is placed in said cup holder, the first laterally projecting food receptacle portion defining a second cavity adapted to receive victuals; and
(c) at least a second laterally projecting food receptacle portion thereof which projects laterally from the support member when the insert is placed in said cup-holder, the second laterally projecting food receptacle portion defining a third cavity for receiving victuals,
wherein said third cavity is angularly offset with respect to said second cavity across said first cavity at an angle of from about 60 degrees to about 140 degrees with the provisos:
(d) that said cup-holder insert defines a single circular central cavity for receiving a cup characterized in that it defines a diameter, D, at its upper portion; and
(e) that the laterally projecting food receptacle portions are configured such that their cavities extend laterally a distance less than the diameter, D, of the central cavity;

wherein said first laterally projecting food receptacle portion has a generally rectangular cross-section with four opposing sidewall segments configured such that the minor axis of said second cavity is substantially coextensive with a line bisecting the mouth of said first cavity and has a length of form about 1¾ inches to about 3 inches, said first cavity being provided with a substantially flat bottom, as well as a major axis of from about 3 inches to about 4.5 inches; and wherein further said second laterally projecting food receptacle portion defines an upwardly concave substantially hemicylindrical cavity provided with an arcuate bottom.

30. The cup-holder insert according to claim 29, wherein said third cavity is angularly offset with respect to said second cavity at an angle of from about 60 degrees to about 100 degrees.

31. The cup-holder insert according to claim 30, wherein said third cavity is angularly offset with respect to said second cavity at an angle of from about 70 degrees to about 90 degrees.

32. The cup-holder insert according to claim 29, wherein said cup-holder insert further comprises a third laterally projecting portion defining a fourth cavity disposed between said second and third cavities.

33. The cup-holder insert according to claim 32, wherein said third cavity is angularly offset with respect to said second cavity at an angle of from about 100 degrees to about 140 degrees.

34. The cup-holder insert according to claim 32, wherein said third cavity is angularly offset with respect to said second cavity at an angle of from about 110 degrees to about 130 degrees.

35. The cup-holder insert according to claim 29, wherein said cup-holder insert further comprises a third laterally projecting portion defining a fourth cavity disposed between said second and third cavities and said third cavity is angularly offset with respect to said second cavity at an angle of from about 100 degrees to about 140 degrees.

36. The cup holder insert according to claim 32, wherein said fourth cavity is substantially cylindrical and has a diameter of from about 1.5 to about 2.5 inches.

* * * * *

UNITED STATES PATENT AND TRADEMARK OFFICE
CERTIFICATE OF CORRECTION

PATENT NO.     : 6,533,233 B2
DATED          : March 18, 2003
INVENTOR(S)    : Michael G. Thomas It is certified that error appears in the above-identified patent and that said Letters Patent is hereby corrected as shown below:

Column 3,
Line 58, change "form" to -- from --;

Column 4,
Line 62, delete "and";
Line 63, delete "." and insert -- ; and --

Column 5,
Line 28, insert -- is -- after "22";
Line 45, delete ",";

Column 6,
Line 43, insert -- be -- before "supported";
Line 61, delete "in" after "coplanar";

Column 8,
Line 2, change "29" to -- 290 --;
Line 18, delete "or" and insert -- of --;

Column 9,
Line 35, delete "which";
Line 36, change "396" to -- 386 --;

Column 11,
Line 55, change "al" to -- at --;

Column 12,
Line 12, change "flood" to -- food --;
Line 18, change "form" to -- from --; and

UNITED STATES PATENT AND TRADEMARK OFFICE
CERTIFICATE OF CORRECTION

PATENT NO. : 6,533,233 B2
DATED : March 18, 2003
INVENTOR(S) : Michael G. Thomas It is certified that error appears in the above-identified patent and that said Letters Patent is hereby corrected as shown below:

Column 13,
Line 7, change "form" to -- from --.

Signed and Sealed this

Second Day of September, 2003

JAMES E. ROGAN
*Director of the United States Patent and Trademark Office*